(12) United States Patent
Andreoli-Fang et al.

(10) Patent No.: US 10,492,104 B2
(45) Date of Patent: Nov. 26, 2019

(54) LATENCY REDUCTION IN WIRELESS SERVICE

(71) Applicant: Cable Television Laboratories, Inc., Louisville, CO (US)

(72) Inventors: Jennifer Andreoli-Fang, Boulder, CO (US); Bernard McKibben, Broomfield, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 246 days.

(21) Appl. No.: 15/236,147

(22) Filed: Aug. 12, 2016

(65) Prior Publication Data

US 2017/0265220 A1    Sep. 14, 2017

Related U.S. Application Data

(60) Provisional application No. 62/357,770, filed on Jul. 1, 2016, provisional application No. 62/345,634, filed on Jun. 3, 2016, provisional application No. 62/353,755, filed on Jun. 23, 2016, provisional application No. 62/339,463, filed on May 20, 2016, (Continued)

(51) Int. Cl.
| | | |
|---|---|---|
| *H04W 28/20* | (2009.01) | |
| *H04W 28/02* | (2009.01) | |
| *H04W 72/10* | (2009.01) | |
| *H04W 76/14* | (2018.01) | |
| *H04W 72/08* | (2009.01) | |
| *H04W 84/12* | (2009.01) | |
| *H04W 84/04* | (2009.01) | |
| *H04W 28/24* | (2009.01) | |

(52) U.S. Cl.
CPC ....... *H04W 28/20* (2013.01); *H04W 28/0268* (2013.01); *H04W 28/0278* (2013.01); *H04W 72/085* (2013.01); *H04W 72/10* (2013.01); *H04W 76/14* (2018.02); *H04W 28/24* (2013.01); *H04W 84/042* (2013.01); *H04W 84/12* (2013.01)

(58) Field of Classification Search
CPC .......................... H04W 72/14; H04W 28/0268
USPC .......................................................... 370/329
See application file for complete search history.

(56) References Cited

U.S. PATENT DOCUMENTS 6,157,614 A    12/2000  Pasternak et al.
7,899,451 B2    3/2011  Hu et al.
(Continued)

OTHER PUBLICATIONS

International Search Report in PCT/US17/21918, dated Aug. 16, 2017.

*Primary Examiner* — Samina F Choudhry
(74) *Attorney, Agent, or Firm* — David Daniel Smith; Cable Television Laboratories, Inc.

(57) ABSTRACT

Systems and methods presented herein provide latency reduction in wireless service through a communication link. In one embodiment, a method includes linking a modem to a Modem Termination System (MTS) via the communication link and detecting, at the modem, a message from a wireless service link indicating that a user equipment (UE) has data to transmit to a Mobile Network Operator (MNO). The method also includes requesting a data transfer from the modem to the MTS in response to detecting the message from the wireless service link and processing the request from the modem at the MTS. The method also includes granting the request while the UE is negotiating with the wireless service link to transmit the data of the UE.

8 Claims, 9 Drawing Sheets

Related U.S. Application Data provisional application No. 62/306,360, filed on Mar. 10, 2016.

(56) References Cited

U.S. PATENT DOCUMENTS

| | | |
|---|---|---|
| 8,867,490 B1 | 10/2014 | Krishna et al. |
| 8,897,312 B2 | 11/2014 | Pesola |
| 9,754,454 B2 | 9/2017 | Onorato et al. |
| 2005/0159162 A1 | 7/2005 | Park |
| 2008/0020797 A1 | 1/2008 | Denney et al. |
| 2009/0156213 A1 | 6/2009 | Spinelli et al. |
| 2010/0118752 A1* | 5/2010 | Suzuki ............... H04W 52/0258 370/311 |
| 2010/0172368 A1 | 7/2010 | Eng |
| 2010/0284314 A1 | 11/2010 | Pelletier et al. |
| 2012/0287784 A1 | 11/2012 | Shatzkamer et al. |
| 2012/0321312 A1 | 12/2012 | Timm et al. |
| 2013/0010686 A1 | 1/2013 | Shatzkamer et al. |
| 2013/0142157 A1 | 6/2013 | Pesola |
| 2014/0056130 A1 | 2/2014 | Grayson et al. |
| 2014/0328190 A1* | 11/2014 | Lord ..................... H04W 24/08 370/252 |
| 2015/0358838 A1 | 12/2015 | Wei et al. |
| 2016/0262169 A1* | 9/2016 | Das ................... H04W 72/1215 |
| 2017/0244539 A1* | 8/2017 | Hanna ................... H04L 7/0008 |
| 2017/0280467 A1 | 9/2017 | Zhu et al. |
| 2017/0330408 A1 | 11/2017 | Onorato et al. |

* cited by examiner

LATENCY REDUCTION IN WIRELESS SERVICE

CROSS REFERENCE TO RELATED APPLICATIONS

This patent application claims priority to, and thus the benefit of an earlier filing date from, U.S. Provisional Patent Application Nos. 62/357,770 (filed Jul. 1, 2016), 62/345,634 (filed Jun. 3, 2016), 62/353,755 (filed Jun. 3, 2016), 62/339,463 (filed May 20, 2016), 62/306,360 (filed Mar. 10, 2016), the entire contents of each of which are hereby incorporated by reference.

BACKGROUND

Mobile Network Operators (MNOs) operate a mobile core to provide wireless service to a variety of wireless user equipment (UEs, such as cell phones, laptop computers, tablet computers, etc.). The wireless networks of these MNOs exist in a variety of forms and operate using a variety of modulations, signaling techniques, and protocols, such as those found in Wifi, 3G, 4G, 5G and Long Term Evolution (LTE) networks. Some MNOs even operate with Multiple-System Operators (MSOs), Telecommunications Companies (telcos), satellite operators (including high speed satellite broadband services), fiber operators, and UAV internet providers, collectively referred to as "Operators". For example, Operators routinely provide internet services to the MNOs for backhaul traffic, while the MNO provides wireless services for the Operator. In addition, some Operators operate both the wired services and MNO services.

Now, MSOs are even providing "small cells" such that a UE can communicate through its MNO via an MSO. For example, an MSO may deploy an antenna/interface that a UE can communicate with via its respective wireless protocol. The MSO packages the communications between the UE and the MNO via the MSO's protocol, for example Data Over Cable Service Interface Specification (DOCSIS). However, latency is incurred because of the serial nature of data transfer grants between DOCSIS and the wireless protocol.

SUMMARY

Systems and methods presented herein provide for a latency reduction in wireless service through a request-grant based communication link, for example a DOCSIS communication link. In one embodiment, a method includes linking a modem to a Modem Termination System (MTS) via the DOCSIS communication link and detecting, at the modem, a message from a wireless service link indicating that a user equipment (UE) has data to transmit to a Mobile Network Operator (MNO). Other embodiments contemplated utilizing an optical network. An optical network may be formed with, for example, an Optical Network Terminal (ONT) or an Optical Line Termination (OLT), and an Optical Network Unit (ONU), and may utilize optical protocols such as EPON, RFOG, or GPON. Embodiments also contemplated exist in other communication systems capable of backhauling traffic, for example, a satellite operator's communication system. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a modem, an Optical Network Units (ONU), a DSL unit, etc. collectively called a "modem." Further, to simplify description a protocol such as DOCSIS, EPON, RFOG, GPON, Satellite Internet Protocol, is called a "protocol."

In an embodiment, the present system and method handles a data request for transmitting from a modem to a mobile core via the wireless service link. In an embodiment, the processing of the data request from the modem occurs at least in part at the MTS. The system and method are capable of processing a wireless request to result in a wireless grant substantially simultaneous to the backhaul negotiation of the transmission of UE data over the backhaul network.

In an embodiment, the UE is an LTE wireless device in wireless communication with an eNodeB, although it will be understood that the present invention is equally applicable for use with 2G, 3G, 5G, and other wireless protocol systems.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below. For example, the following description is discussed as applied to an LTE-DOCSIS cooperative network for implementing latency reduction in wireless service between a user device and a wireless core. It will be appreciated that the present latency reduction in wireless service system and method may equally be applied in systems utilizing macrocells, WiFi, satellite communication systems, optical backhaul systems (EPON, GPON, RFOG), MU-MIMO, laser communication, and even aerial vehicles such as unmanned aerial vehicles (UAV) and balloons that provide wireless and/or laser communication. That is, the present invention may be used in many wireless-to-backhaul systems where at least one of the wireless system or backhaul system utilizes a request-grant protocol for data transmission.

Figure 1:
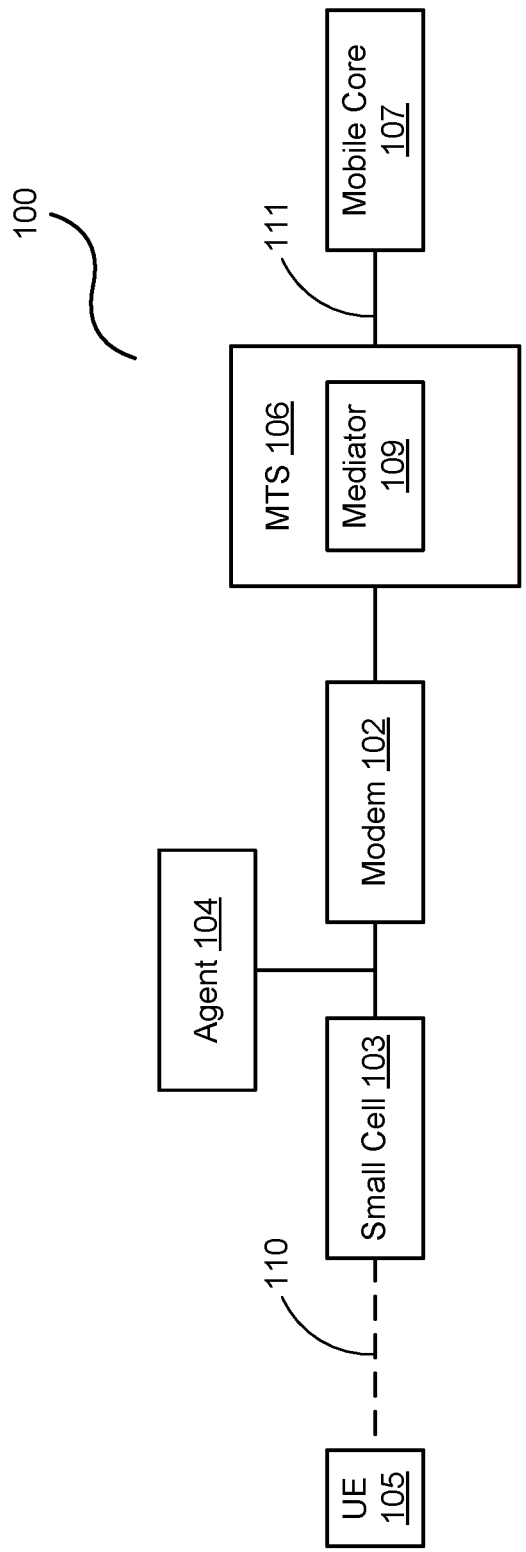
FIG. 1 is a block diagram of an exemplary wireless service link through an MTS.

FIG. 1 is a block diagram of an exemplary wireless service link 100 including a mediator 109 configured with an MTS 106. It will be understood that mediator 109 may be integrated with or communicatively coupled with MTS 106. The MTS 106 may be, for example, a CMTS, a Fiber Node, a Fiber Hub, an optical network unit (ONU), or other termination device. Mediator 109 may be implemented, for example, as a software agent in any of such devices. If mediator 109 is integrated with an MTS, integration may be via software or hardware.

A UE 105 may wirelessly communicate with other UEs (not shown) in a wireless service network for the purpose of transmitting and/or receiving data. A mobile core 107 (i.e., operated by an MNO) controls the operations of the UE 105 within the wireless network. This includes, among other things, managing subscription information (e.g., data communication, data plans, roaming, international calling, etc.) and ensuring that the UE 105 can place calls and transmit data within the wireless network. Mediator 109 cooperates with the MTS to provide a communication link between the UE 105 and the mobile core 107 such that the mobile core 107 can control the operations of the UE 105, for example, when the UE 105 is within range of a "small cell" 103.

In the past, MNOs often maintained, operated, and controlled wireless base stations themselves for the purposes of providing communications with UEs. For example, an MNO employing LTE communications may operate a plurality of eNodeBs in an area to provide wireless services to subscribing UEs in that area.

Now operators are capable of acting as backhaul operators. For example, MSOs are seeking to increase their value to the MNOs by providing alternative backhaul paths for communication between UEs, such as UE 105, and the mobile core, such as mobile core 107. MSOs and small/independent wireless operators currently employ wireless devices, such as the small cell 103, for capturing a wireless data transmission and passing it through a backhaul system, as shown in FIG. 1. In the embodiment of FIG. 1, the backhaul system includes modem 102, MTS 106, and mediator 109 and may additionally include an optional agent 104, which is discussed further below. The small cell 103 comprises many of the features of a larger base station such as the air-to-air interface and protocol handling. In some instances, the small cell 103 may be a multi-radio hotspot providing for WiFi, as well as LTE Licensed Assisted Access (LTE-LAA) or LTE Unlicensed (LTE-U).

In an alternative embodiment communication is only WiFi communication and is between a STA (not shown) a WiFi core (not shown). To modify the system of FIG. 1 to accommodate the WiFi embodiment the skilled artisan would replace small cell 103 with a WiFi station (STA) and the mobile core 107 with a WiFi core.

Small cells and similar wireless technologies (collectively discussed and represented herein as small cells) represent new opportunities for MNOs. These new small cells allow operators to access additional spectrum, use existing spectrum more efficiently, and promote greater deployment flexibility, all at a lower cost. Small cells also reduce radio access network build-out and backhaul investment, while improving the end user experience by providing increased access to mobile networks. Additionally, because small cells are much smaller, they can reduce a base station's footprint and have less environmental impact (e.g., in terms of power consumption).

The MSOs and MNOs, evolving from different technologies, generally employ different communication protocols and offer little insight to each other. For example, the MSOs may employ the DOCSIS protocol to transport data to and from a modem 102. The MNOs, on the other hand, may employ a variety of wireless protocols including EDGE (Enhanced Data rates for GSM Evolution), 2G, 3G, 4G, 5G, LTE, or the like. While an MTS and a modem may be able to transport the wireless service traffic of the UE and the mobile core, the MTS and the modem need not process the data transmitted. Rather, the MTS and the modem simply route the traffic between the appropriate parties. In the example of FIG. 1, traffic is routed between UE 105 and mobile core 107 via small cell 103, modem 102, and MTS 106.

This lack of insight by the backhaul system into the wireless system's data, and vice versa (e.g., LTE system into the DOCSIS system, and vice versa), causes the grant of a request to transmit data across the wireless service link 100 to occur in a serial manner. For example, when the small cell 103 provides a grant to the UE 105 to transfer data to the small cell 103, the modem 102 and the MTS 106 are unaware that the small cell 103 has provided a grant for a data transfer from the UE 105. When the data arrives at the small cell 103 it is then forwarded to the modem 102. Only when the data arrives at the modem 102 from the small cell 103 does the modem transmit a request to the MTS 106. The modem-to-MTS grant alerts the MTS 106 that the modem 102 has data to transmit and requires resources to do so. The MTS 106 can then schedule resources for the modem 106 and transmits that as a "grant" back to the modem 102. The data is then transferred from the modem 102 to the MTS 106 and then forwarded on to the mobile core 107. This serial granting of data transfers results in unnecessary latency to the overall data transfer from UE 105 to mobile core 107.

In the case of high-priority data, such as voice data, the unnecessary latency may result in the data being irrelevant by the time it reaches the intended recipient. For example, the UE 105 transfers blocks of data representing relatively small portions of a conversation. When some of the blocks of data are delayed, they may no longer be relevant to the conversation and are as such dropped. When this occurs regularly, the quality of the conversation and the user's quality of experience (QoS) are degraded significantly. Similar issues exist when non-voice data is transmitted across the network, such as video data (live or stored), security data, access and control over remotely located resources, machine-to-machine applications, etc.

In this embodiment, the modem 102 learns from the small cell 103 that the UE 105 has issued a scheduling request to transfer data to the small cell 103. For example, the small cell 103 may be an eNodeB operable to communicate in an LTE network, or a WiFi Access Point (STA) operable to communicate in a WiFi network. The UE 105, when it needs to transfer data across the wireless service link 100, issues a scheduling request (SR) to the eNodeB. The eNodeB then determines when the UE 105 can transfer data to the eNodeB and issues an uplink (UL) grant to the UE 105. The UE 105 then transfers its data to the eNodeB such that the eNodeB can propagate it through the wireless service link 100 to the mobile core 107 operated by an MNO for subsequent processing, routing, and the like.

When the UE 105 has data to transmit the preparation for the transmission process can be a multistep process by itself. For example, if the UE 105 does not have a valid grant, the UE 105 issues an SR then, after receiving the grant, transfers a buffer status report (BSR) to the eNodeB indicating how much data it is requesting to be transferred. The eNodeB then issues the subsequent grant indicating the actual amount of data that can be transmitted. Upon receiving the grant, the UE 105 transfers its data to the eNodeB.

The small cell 103 informs the modem 102 of the SR just after the small cell 103 receives it. In an embodiment, this is accomplished by the small cell 103 transmitting an out of band message to the modem 102 to indicate that the small cell 103 has received the SR. Alternatively or additionally, a modem 102 that is configured with functionality to read the SR may do so. The modem 102 may read the SR to learn, for example, that the UE 105 is requesting to transfer data to the small cell 103. For example, the modem 102 may be configured with and/or include a portion of an eNodeB such that it can detect and read the LTE protocol, and therefore the SR, from the UE 105.

In a separate embodiment, the agent 104 (e.g., formed in software, hardware, or a combination thereof) may exist between the small cell 103 and the modem 102 (or as a part of the small cell 103 and/or the modem 102). Agent 104 is configured to intercept the SR or generate a copy of the SR during its transit from the small cell 103 to the modem 102, unpacks the SR (or the copy), and transmits an out of band message to the modem 102 pertaining to the data containing within the SR. Once the modem 102 learns of the SR from agent 104, the modem 102 can alert the MTS 106 that it will need to transfer data when the modem 102 receives it from the UE 105 (e.g., through the small cell 103). Alternatively, the modem 102 simply forwards the SR in a manner similar to that of any other received data. It is then up to the MTS 106 or Mediator 109 to process the SR.

Thus, while the UE 105 and the small cell 103 are negotiating the transfer of data through the wireless service link 100, the modem 102 and the MTS 106 can negotiate their transfer of data before the data of the UE 105 arrives at the modem 102. This allows the data transfer scheduling and granting processes of the wireless service link 100 and the backhaul communication link to occur in parallel or substantially in parallel.

Alternatively or additionally, an MTS may be configured with functionality of the mobile core 107. For example, in a DOCSIS protocol embodiment, the MTS 106 is a CMTS, and may include functionality of an LTE gateway that is operable to intercept a scheduling request from the UE 105 indicating that it needs to transfer data to the mobile core 107. This may direct the MTS 106 to initiate the establishment of a communication session between the MTS 106 and the modem 102.

In another embodiment, the modem 102 and/or the MTS 106 may be configured to wait until the message is received from the small cell 103 pertaining to the amount of data to be transferred from the UE 105. For example, when the small cell 103 receives an initial SR, the small cell 103 understands that another detailed request will follow with a BSR requesting a data transfer of a particular size. The small cell 103 will then know when that data transfer will occur and how much data will be sent. Accordingly, this information is then conveyed to the modem 102 and/or the MTS 106 to initiate the granting through the backhaul's protocol based on when the actual data transfer will occur and the data size.

Based on the foregoing, the UE 105 is any device, system, software, or combination thereof operable to communicate wirelessly with a wireless network using any one or more wireless protocols including, 2G, 3G, 4G, 5G, LTE, LTE-U, LTE-LAA, or the like, as well as with a WiFi network using any one or more wireless service protocols including 802.11ax. Examples of the UE 105 include, but are not limited to, laptop computers, tablet computers, and wireless telephones such as smart phones. The small cell 103 is any device, system, software, or combination thereof operable to provide an air-to-air interface for the mobile core 107, one example of which is a WiFi core. Examples of the small cell 103 include WiFi access points and base stations operating as eNodeBs in a wireless network. The modem 102 is any device, system, software, or combination thereof operable to provide data transfers with an MTS. Examples of the modem 102 include DOCSIS enabled set-top boxes. The MTS 106 is any device, system, software, or combination thereof operable to communicate with the modem 102 as well as provide a wireless service session through the communication link provided by the modem 102 and the MTS 106. Other exemplary embodiments are shown and described below.

Figure 2:
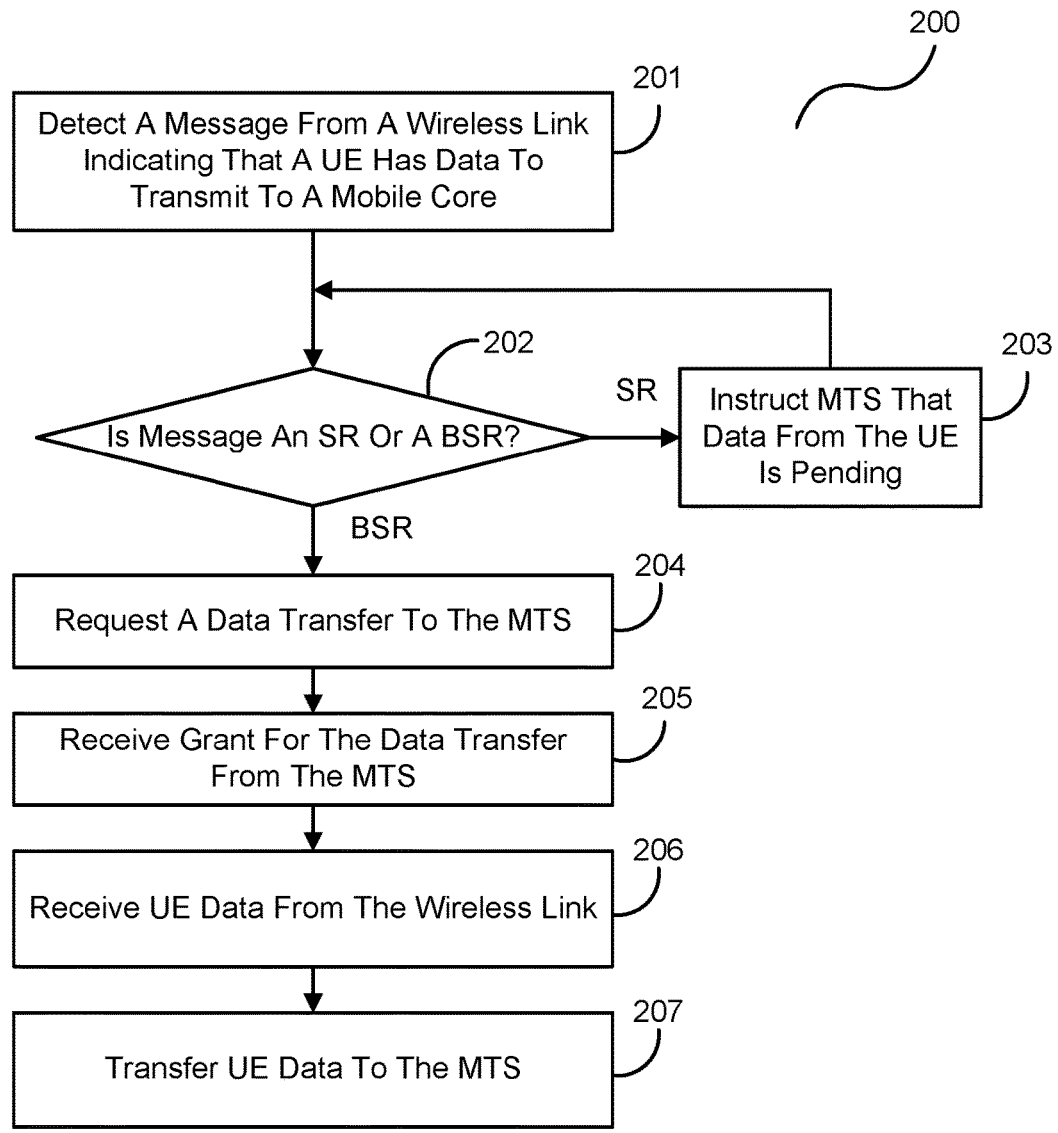
FIG. 2 is a flowchart illustrating an exemplary process operable with a modem of the wireless service link of FIG. 1.

FIG. 2 is a flowchart illustrating an exemplary process 200 operable with the modem 102 of the wireless service link 100 of FIG. 1. In this embodiment, the modem 102 detects a message from a wireless service link 100 indicating that the UE 105 has data to transmit to the mobile core 107, in the process element 201. For example, the modem 102 may receive an out of band signaling message from the small cell 103 and/or unpack an SR received by the small cell 103 indicating that the UE 105 requests a data transmission. Alternatively, the agent 104 may receive, intercept or generate a copy of an SR sent from the small cell 103 to the modem 102, unpack the SR, and send an out of band signaling message to the modem 102 to alert the modem 102 of the scheduling request by the UE 105.

From there, the modem 102 or the agent 104 may determine whether the message is an SR or a BSR, in the process element 202. For example, if the UE 105 wishes to transmit its data to the small cell 103, the UE 105 transmits an SR to the small cell 103 without indicating how much data it wishes to transmit. The UE 105 then receives a grant from the small cell 103, which allows the UE 105 to respond to the small cell 103 with information regarding the amount of data it has to transmit. If the small cell 103 receives the initial SR, then the modem 102 instructs the MTS 106 that data from the UE 105 is pending, in the process element 203. Such will alert the MTS 106 that the modem 102 will be requesting a grant through the communication link established between the modem 102 and the MTS 106. The MTS 106 may further anticipate that the modem 102 will send additional signaling messages, such as the BSR message or the grant for the wireless service link 100 issued by the small cell 103, by issuing a grant for the modem 102 over the communication link established between the modem 102 and the MTS 106. The BSR message indicates the amount and the quality of service (QoS) requirement of data the UE 105 wishes to transfer to the small cell 103. The grant is generated by the small cell 103 for the UE 105 that indicates the amount of data the UE 105 is to transmit and the time of transmission. Knowing the precise amount, the timing, and the QoS assignment of the expected data arrival at the small cell 103 helps the MTS 106 to determine the size, timing, and the QoS assignment of the grant over the DOCSIS communication link. This will also give the MTS 106 ample time to schedule a grant for the modem 102 to transfer data from the UE 105 to the MTS 106 over the communication link.

If the message from the UE 105 is a BSR indicating the amount and the QoS requirement of data being transferred by the UE 105 or a grant that is issued by the small cell 103 indicating the amount of data for transmission, and expected time of data arrival at the small cell 103, then the modem 102 may request a data transfer to the MTS 106, in the process element 204. For example, the modem 102 may generate and transmit a message to the MTS 106 requesting to transfer an amount of data from the UE 105 indicated by the BSR or as indicated by the grant. Alternatively, the modem 102 may simply encapsulate the BSR and/or the grant message and transmit it to the MTS 106. The MTS 106, upon scheduling the data transfer from the modem 102, issues a grant granting the data transfer from the modem 102.

Once the grant by the MTS 106 has been issued, the modem 102 can simply receive the data from the UE 105 in the wireless service link 100, in the process element 206, and transfer the data of the UE 105 to the MTS 106 at its allocated time as indicated by the MAP grants, in the process element 207. That is, requesting/granting of data transfers between the modem 102 and the MTS 106 is performed substantially in parallel with the requesting/granting of data transfers between the UE 105 and the small cell 103, thereby reducing latency in the overall data transfer.

Figure 3:
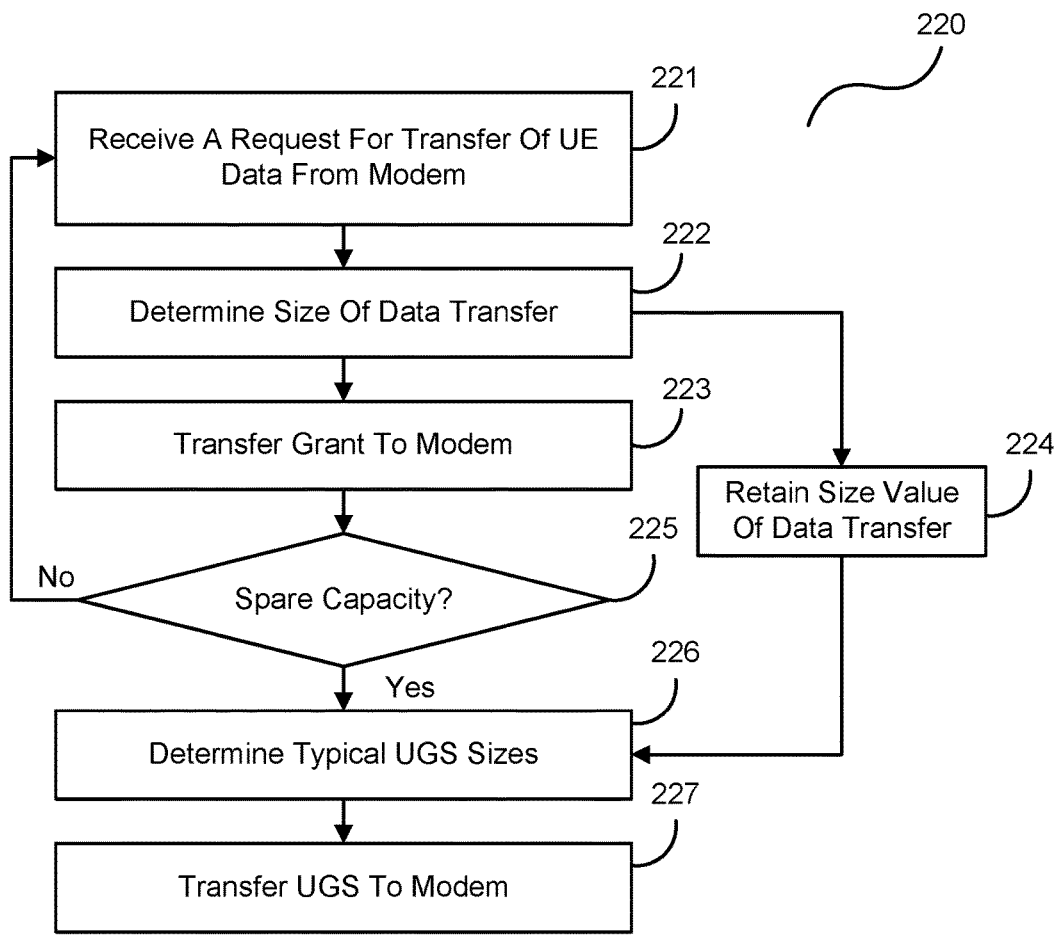
FIG. 3 is a flowchart illustrating an exemplary process operable with the MTS of FIG. 1.

FIG. 3 is a flowchart illustrating an exemplary process 220 operable with the MTS 106 of FIG. 1. In this embodiment, the MTS 106 receives and processes the request from the modem 102 to transfer data of the UE 105, in the process element 221. As mentioned, the request may include information pertaining to the size and the QoS requirement of the data transfer retrieved from a BSR issued by the UE 105 or information pertaining to the size, and the precise time of the data transfer retrieved from a grant issued by the small cell 103. Accordingly, the MTS 106 may determine the size, the QoS assignment, and the timing of the data transfer, either based on the BSR, the grant information, or another internal process, in the process element 222, and schedule a grant of the data transfer. Once the data transfer has been scheduled, the MTS 106 transfers the grant to the modem 102, in the process element 223. Then, when the modem 102 receives the data from the UE 105 through the small cell 103, the modem 102 can quickly transfer the data to the MTS 106 because the grant is issued substantially in parallel with the grant by the small cell 103 to the UE 105.

The MTS 106 may store in memory the amount of data associated with the data transfer (and optionally all previous UE data transfers), in the process element 224. For example, the MTS 106 may be operable to issue unsolicited data transfer grants through an unsolicited grant service (UGS) or some other unsolicited grant. When the MTS 106 has spare capacity (i.e., the process element 225) the MTS 106 can transfer an unsolicited grant to the modem 102 without being requested to do so such that the modem 102 can transfer data (UE data and/or modem data) if it has any without delay associated with a request-grant process. By retaining the size value of the data associated with the previous UE data transfers (and optionally all previous UE data transfers), the MTS 106 can better estimate how much spare data transfer capacity can be issued through unsolicited grants and further decrease system latency.

In one illustration, UEs 105(1)-(4) (not shown) request data transfers to the small cell 103 at or about the same time. For example, UE 105(1) needs to transmit two bytes of data, UEs 105(2) and UEs 105(3) need to transmit four bytes of data each, and UE 105(4) needs to transmit six bytes of data, thus totaling 16 bytes of data. The small cell 103 may combine the data transfer information into a BSR for transmission to the MTS 106. The MTS 106 may use this information to generate subsequent unsolicited grant of 16 bytes of data such that all of the data from UEs 105(1)-(4) may be transferred at or about the same time.

The MTS 106 may determine any type of typical unsolicited grant sizes for the modem 102, as shown in process element 226. For example, the MTS 106 may average the data sizes of BSRs from the small cell 103 over time, may use data sizes of one or multiple UEs 105, may base the data sizes of the unsolicited grants on a time of day, or the like. In any case, when the MTS 106 has spare capacity and determines a size of the unsolicited grant, the MTS 106 may transfer the unsolicited to the modem 102, as in process element 227, such that the modem 102 can transfer data of the UE 105 that it receives from the small cell 103.

Figure 4:
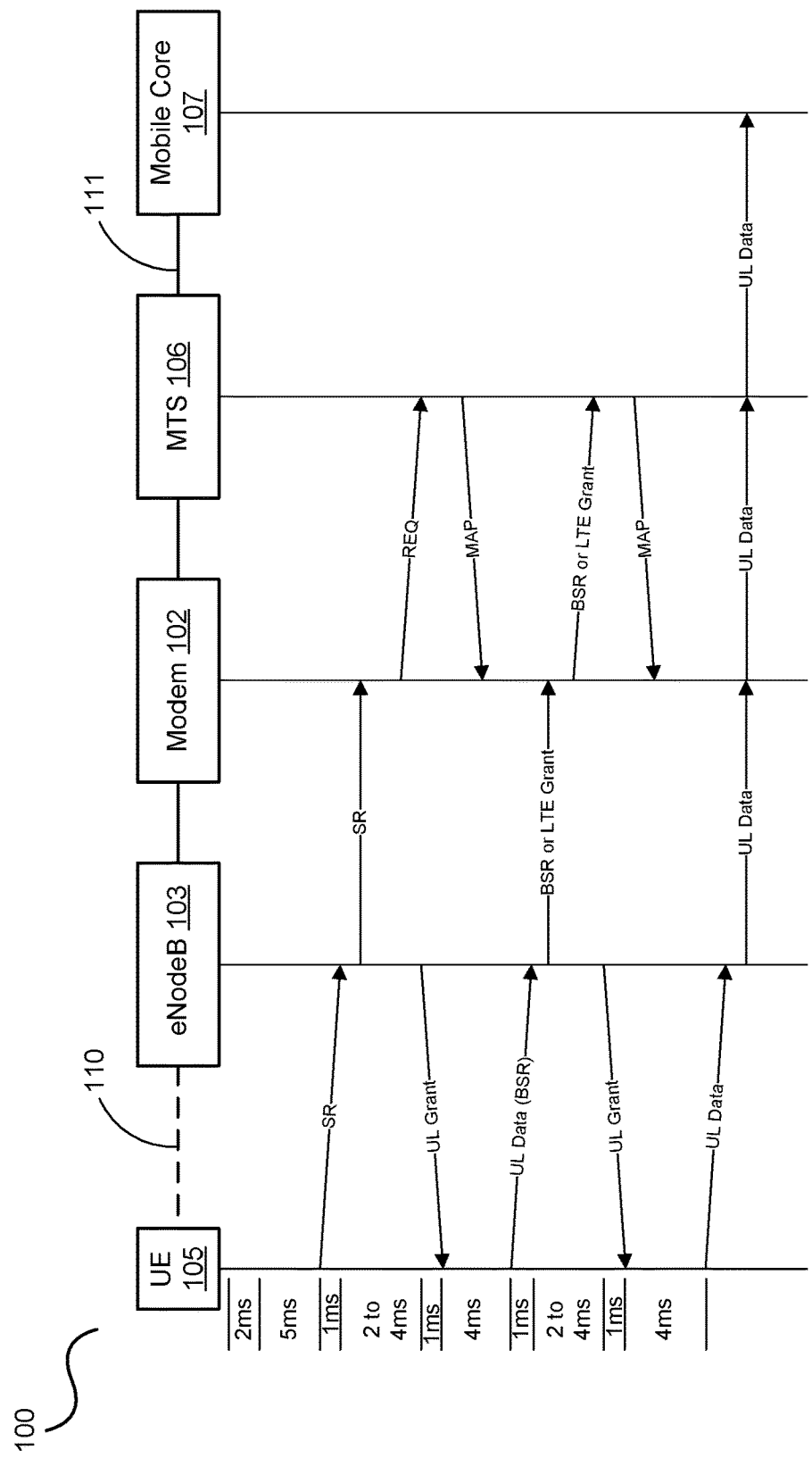
FIG. 4 is an exemplary communication diagram of the wireless service link through an MTS of FIG. 1.

FIG. 4 is an exemplary communication diagram of the wireless service link 100 of FIG. 1. In this embodiment, the small cell 103 is an eNodeB operable within an LTE network and employing LTE communication protocols. To the left of the UE 105 are timing diagrams exemplary of the LTE communication protocol. Timing as shown and discussed is not meant to be limiting in anyway, but merely for illustrative purposes and to convey understanding. For example, after a data arrives at the UE, the UE 105 processes the data to determine an SR is needed. The UE 105 waits for 5 ms for an SR opportunity then the UE 105 transfers the SR to the eNodeB 103, which typically takes 1 ms. The eNodeB 103 processes the SR and generates a grant which typically takes between 2 and 4 ms before it sends a first UL grant to the UE 105, which again takes typically 1 ms. Upon receipt of the first UL grant the UE 105 processes the grant, getting a BSR ready for transmission, which typically takes 4 ms, then transmits uplink (UL) data, e.g., a BSR, back to the eNodeB 103, again a 1 ms transmission. This UL data is generally just an indicator of the amount of UL data that is requested from the UE 105 when a second UL grant from the eNodeB 103 is received. That is, the UE 105 transfers the BSR, which also acts as an SR, to the eNodeB 103 indicating how much data is to be expected in the next transfer to the eNodeB 103.

The eNodeB 103 process the BSR and generates a second UL grant for the UE 105 in 2 to 4 ms. The UE 105 processes the received second grant and prepares the data for transmission, which can take between 2 and 4 ms, then sends the data to the eNodeB 103.

Upon receiving the initial SR, the eNodeB 103 may, for example, communicate information about the SR to the modem 102 through out of band signaling or transfer the SR to modem 102. If the SR is sent to the modem 102 the SR can be unpacked and modem 102 can determine that the UE 105 has data to be transmitted across the wireless service link 100 and optionally the type of data. In this regard, the modem 102 may request a data transfer from the MTS 106 such that the MTS 106 can begin scheduling for the data of the UE 105. The MTS 106 issues a MAP grant (or some other type of grant) to facilitate the further transfer of BSR and/or LTE grant from the modem 102.

When the eNodeB 103 receives the BSR, it may transfer the BSR in whole, information about the BSR, the actual LTE grant of the UE 105, or some combination thereof, to the modem 102. The LTE grant issued by the eNodeB 103 provided information regarding the size and the precise timing at which the UE 105 is scheduled to transmit its data. This, along with BSR, indicates to the modem 102 how much data, at what QoS is to be expected by the UE 105, and the precise time. The modem 102 then transfers this information (e.g., the BSR, the LTE grant, or similar as discussed above) to the MTS 106. As the MTS 106 has been preparing for the actual transfer of data from the UE 105, the MTS 106 can transfer a data transfer grant (e.g., a DOCSIS MAP in a cable network embodiment) to the modem 102. With the grant in hand, the modem 102 can simply wait for the UL data from the UE 105 and the eNodeB 103 such that it may be immediately forwarded to the MTS 106 through the communication link. Upon receipt of the data the MTS 106 then forwards it to the mobile core 107.

Although shown or described in a particular form of messaging, the invention is not intended to be limited to the exemplary embodiment. The MTS may have a gateway configured therewith that is operable to interpret LTE traffic. The modem 102 may simply wait until it receives a BSR and transfer it as part of the request for data transmission. The MTS 106 may then issue the data transfer grant based on the BSR or the LTE grant info, and the information contained therein.

Figure 5:
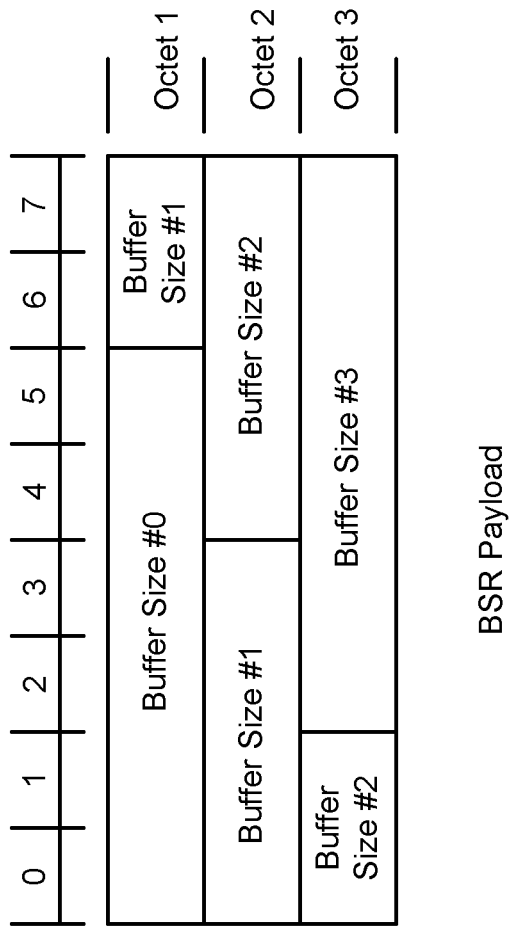
FIG. 5 is a block diagram of an exemplary buffer status report (BSR) operable with the wireless service link of FIG. 1.

FIG. 5 is a block diagram of an exemplary buffer status report (BSR) operable with the wireless service link of FIG. 1. In LTE, the SR is typically a 1-bit indicator sent by UE 105 to request UL bandwidth. But, the SR alone is not sufficient for the eNodeB 103, that is, the eNodeB 103 needs more information about a size of the data to be transmitted from UE 105 before it can provide a data grant to the UE 105. So, the eNodeB 103 simply sends a grant of sufficient size for the transmission of the BSR from the UE 105 to the eNodeB 103.

As illustrated in FIG. 5, the BSR is this configured as a 3-byte MAC control element that reports outstanding data for each of UE 105's four logical channel groups. The mapping of a radio bearer (i.e., a logical channel) to a logical channel group (LCG) is done at the session setup time by the eNodeB 103 based on the corresponding QoS attributes of the radio bearers (e.g., QoS Class Identifier (QCI), an Allocation and Retention Priority (ARP), a Guaranteed Bit Rate (GBR), a Maximum Bit Rate (MBR), an Access Point Name-Aggregate Maximum Bit Rate (APN-AMBR), a UE-AMBR, etc.). For example, radio resource control (RRC) messages map to LCG0. The embodiments herein allow the LCG to be directly mapped to the upstream service flow.

Figure 6:
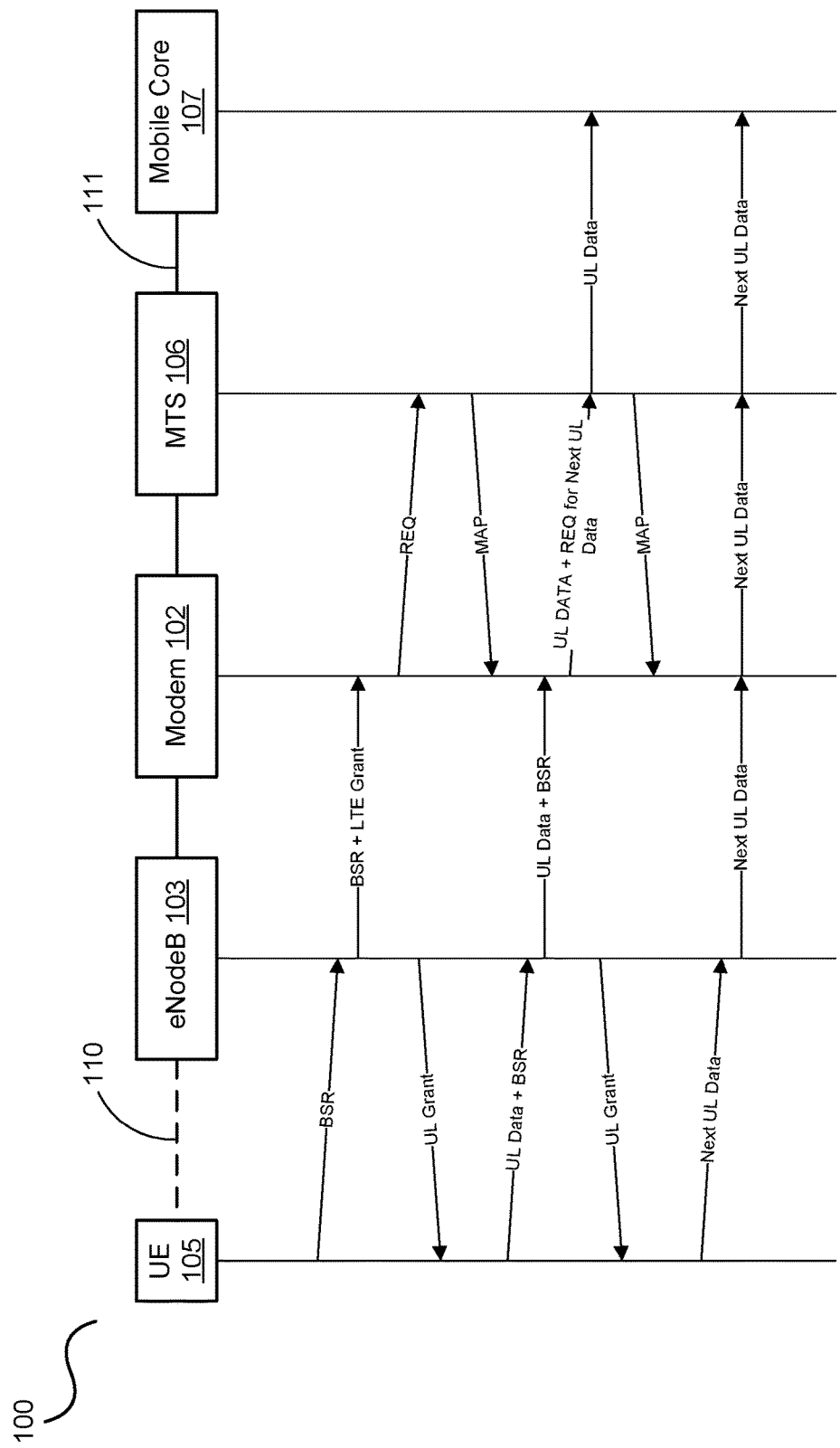
FIG. 6 is another exemplary communication diagram of the wireless service link through the MTS of FIG. 1.

FIG. 6 is another exemplary communication diagram of the wireless service link 100 of FIG. 1. In this embodiment, data transfer grants by the MTS 106 are based upon the BSRs from the UE 105. That is, the UE 105 already has a valid LTE grant, without having to first send the SR. This allows the data requesting/granting to be further compacted and thus further reduces latency within the wireless service link 100. For example, the UE 105 issues a BSR to the eNodeB 103. In doing so, the eNodeB 103 transfers the BSR to the modem 102 along with the LTE grant such that the modem 102 knows that the eNodeB 103 will be granting the data transfer to the UE 105. The eNodeB 103 then, or at substantially the same time as the BSR/LTE Grant is sent to the modem 102, transfers the UL grant to the UE 105, such that it can transfer its UL data and optionally another BSR (see below) to the eNodeB 103.

With the LTE grant and the BSR in hand, the modem 102 can request a data transfer of the MTS 106 and indicate within that request how much data will be transferred by the UE 105. The MTS 106 issues a grant to the modem 102 based on the amount of data, QoS requirement and precise timing of the expected data transfer. When the UL data is received by the eNodeB 103, it may be transferred by the modem 102 to the MTS 106.

However, when transmitting the UL data, the UE 105 may also include a BSR for its next transfer of data, as referenced above. The eNodeB, in transferring the UL data, also transfers the subsequent BSR and/or its LTE grant info for the subsequent data transfer from the UE 105 to the modem 102. Thus, the modem 102 is able to request a subsequent data transfer of the MTS 106 using the subsequent BSR and/or LTE grant info. The MTS 106 transfers the first UL data to the mobile core 107. Then, the MTS 106 issues a second grant to the modem 102 which then waits for the second UL data from the UE 105.

When the eNodeB 103 issues the second UL grant to the UE 105, the UE 105 responds in turn with the second UL data to the eNodeB 103. The eNodeB 103 forwards this second UL data to the modem 102. As the modem 102 already has its second grant for the second UL data, it immediately transfers the next UL data to the MTS 106, which in turn forwards the next UL data to the mobile core 107.

Figure 7:
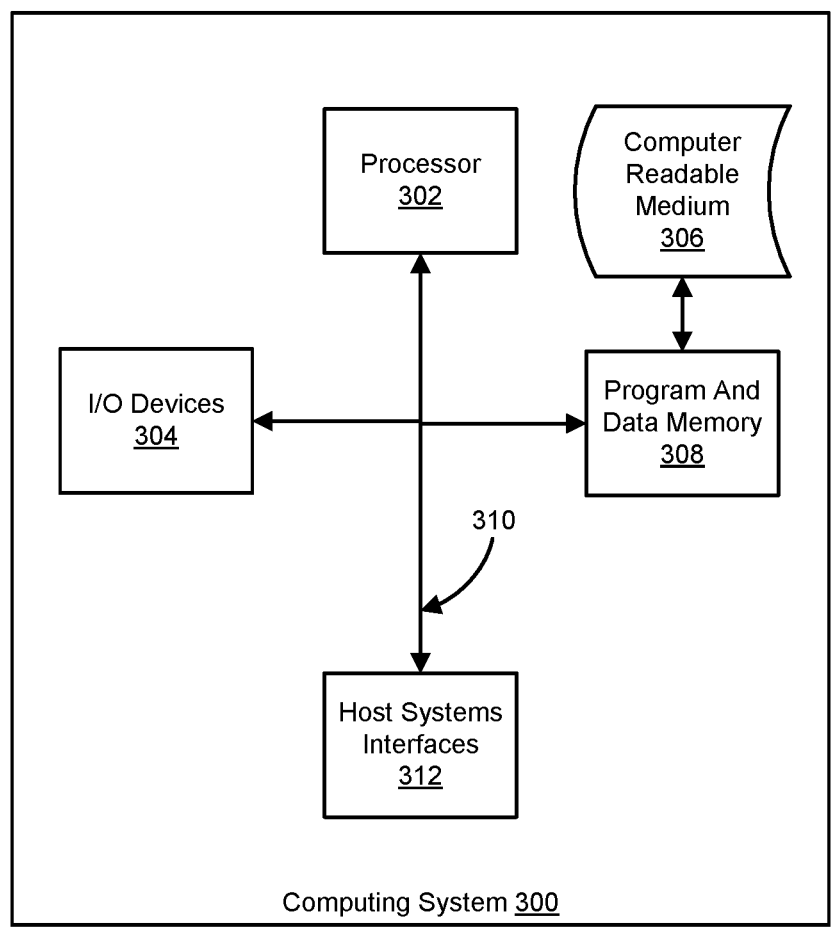
FIG. 7 is a block diagram of an exemplary computing system in which a computer readable medium provides instructions for performing methods herein.

The invention can take the form of an entirely hardware embodiment, an entirely software embodiment or an embodiment containing both hardware and software elements. Embodiments utilizing network functions virtualization (NFV) and virtualized hardware, such as a virtualized MTS, modem, etc., are also contemplated. In one embodiment, the invention is implemented in whole or in part in software, which includes but is not limited to firmware, resident software, microcode, etc. FIG. 7 illustrates a computing system 300 in which a computer readable medium 306 may provide instructions for performing any of the methods disclosed herein.

Furthermore, the invention can take the form of a computer program product accessible from the computer readable medium 306 providing program code for use by or in connection with a computer or any instruction execution system. For the purposes of this description, the computer readable medium 306 can be any apparatus that can tangibly store the program for use by or in connection with the instruction execution system, apparatus, or device, including the computer system 300.

The medium 306 can be any tangible electronic, magnetic, optical, electromagnetic, infrared, or semiconductor system (or apparatus or device). Examples of a computer readable medium 306 include a semiconductor or solid state memory, magnetic tape, a removable computer diskette, a random access memory (RAM), a read-only memory (ROM), a rigid magnetic disk and an optical disk. Some examples of optical disks include compact disk—read only memory (CD-ROM), compact disk—read/write (CD-R/W) and DVD.

The computing system 300, suitable for storing and/or executing program code, can include one or more processors 302 coupled directly or indirectly to memory 308 through a system bus 310. The memory 308 can include local memory employed during actual execution of the program code, bulk storage, and cache memories which provide temporary storage of at least some program code in order to reduce the number of times code is retrieved from bulk storage during execution. Input/output or I/O devices 304 (including but not limited to keyboards, displays, pointing devices, etc.) can be coupled to the system either directly or through intervening I/O controllers. Network adapters may also be coupled to the system to enable the computing system 300 to become coupled to other data processing systems, such as through host systems interfaces 312, or remote printers or storage devices through intervening private or public networks. Modems and Ethernet cards are just a few of the currently available types of network adapters.

Figure 8:
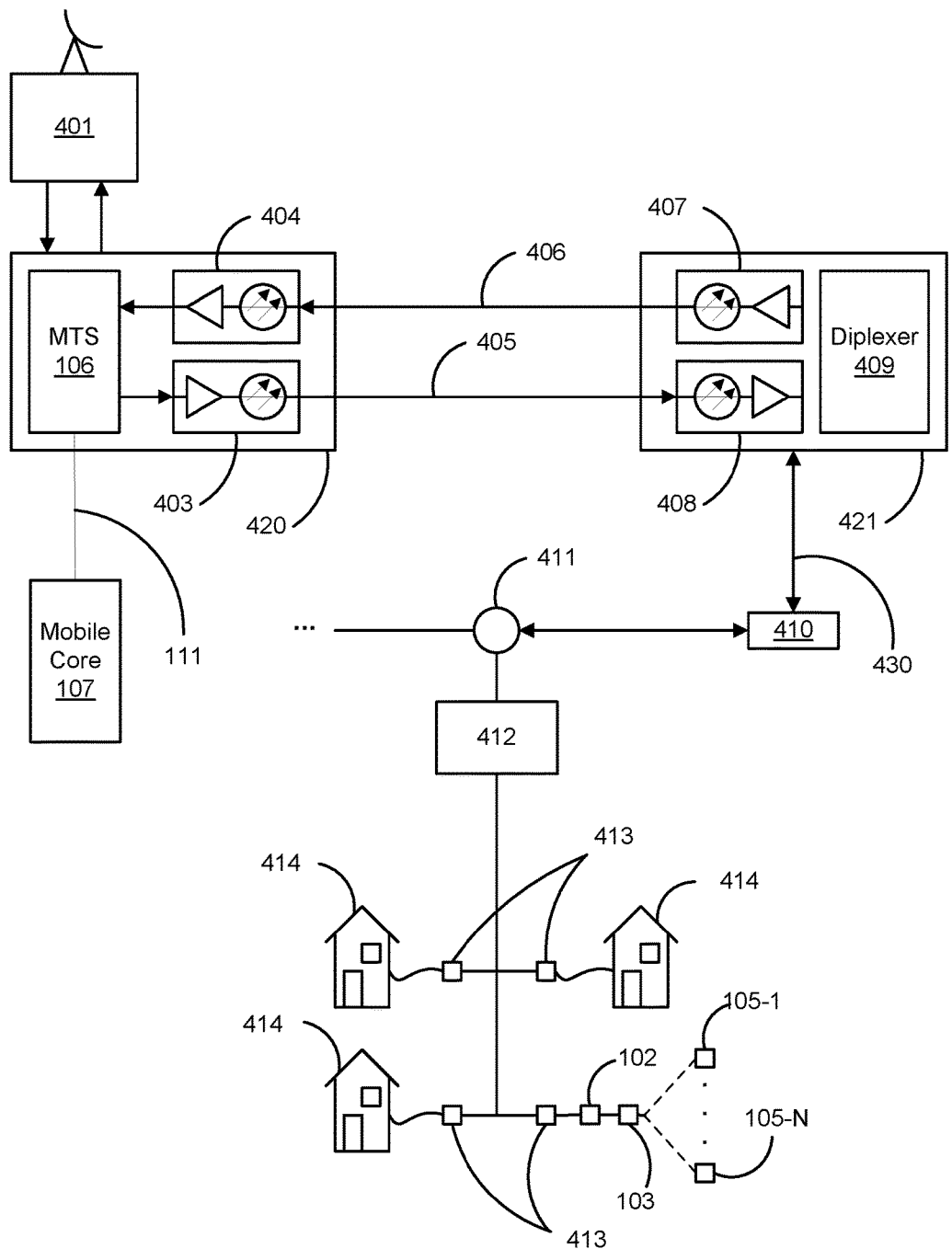
FIG. 8 is a block diagram of a cable network.

FIG. 8 is a block diagram of an exemplary system operable to provide wireless service for a plurality of UEs 105-1-105-N (where "N" is simply intended to represent an integer greater than "1" and not necessarily equal to any other "N" reference designated herein). For example, upstream and downstream links of an exemplary communication system offers high speed data services over connected devices, such as the modem 102. The modem 102 may be configured with or receive communications from the small cell 103 so as to allow the UEs 105 to communicate through the communication system in a manner that is transparent to the user.

The communication system includes a communication component 401 configured with an upstream hub 420. The hub 420 is coupled to a fiber node 421 via optical communication links 405 and 406. The hub 420 includes a Modem Termination System (MTS) 106 an electrical to optical converter 403, and an optical to electrical converter 404. The node 421 is similarly configured with an optical to electrical converter 408 and an electrical to optical converter 407.

The communication component 401 is the source for various communication signals. Antennas may receive communication signals that are converted as necessary and transmitted over fiber optic cables 405 to the hub 420. Several hubs may be connected to a single communication component 401 and the hub 420 may each be connected to several nodes 421 by fiber optic cable links 405 and 406. The MTS 106 may be configured in the communication component 401 or in the hub 420.

Downstream, such as in homes/businesses, are devices that operate as data terminals. These data terminals are modems. A modem can acts as a host for an Internet Protocol (IP) device such as personal computer. However, the modem can be configured with a small cell so as to provide wireless services through the system for the UEs 105-1-105-N.

Transmissions from the MTS 106 to the modem are carried over the downstream portion of the communication system generally in the band between 54 MHz and 3 GHz, for example. Downstream digital transmissions are continuous and are typically monitored by many modems. Upstream transmissions from the modems to the MTS 106 are, for example, typically carried in the 5-600 MHz frequency band, the upstream bandwidth being shared by the Modems that are on-line. However, with greater demands for data, additional frequency bands and bandwidths are continuously being deployed in the downstream and upstream paths. It is also possible that Modems and the MTS engage in full duplex transmission modes, whereby concurrent transmissions on the upstream and the downstream over the same frequency is supported. Equivalent communications and protocols for fiber optic transmissions are also contemplated. For example using an optical network terminal (ONT) or optical line termination (OLT), and an optical network unit (ONU), and equivalent protocols such as EPON, RFOG, or GPON.

The MTS 106 connects the system to the Internet backbone. The MTS 106 connects to the downstream path through an electrical to optical converter 404 that is connected to the fiber optic cable 406, which in turn, is connected to an optical to electrical converter 408 at the node 421. The signal is transmitted to a diplexer 409 that combines the upstream and downstream signals onto a single cable. The diplexer 409 allows the different frequency bands to be combined onto the same cable. The downstream channel width in the United States is generally 6 megahertz to 192 MHz with the downstream signals being transmitted in the 54 MHz to 3 GHz band. Upstream signals are presently transmitted between 5 and 600 MHz, but again other bands are being considered to provide increased capacity.

After the downstream signal leaves the node 421, the signal is typically carried by a coaxial cable 430. At various stages, a power inserter 410 may be used to power the coaxial line equipment, such as amplifiers or other equipment. The signal may be split with a splitter 411 to branch the signal. Further, at various locations, bi-directional amplifiers 412 may boost and even split the signal. Taps 413 along branches provide connections to subscriber's homes 414 and businesses.

Upstream transmissions from subscribers to the hub 420/headend 401 occur by passing through the same coaxial cable 430 as the downstream signals, in the opposite direction on a different frequency band. The upstream signals are sent typically utilizing Quadrature Amplitude Modulation (QAM) with forward error correction. The upstream signals can employ QPSK or any level of QAM, including 8 QAM, 32 QAM, 64 QAM, 128 QAM, 256 QAM, 512 QAM, 1024 QAM, and 4096 QAM. Modulation techniques such as Synchronous Code Division Multiple Access (S-CDMA) and Orthogonal Frequency Division Multiple Access (OFDMA) can also be used. Of course, any type of modulation technique can be used, as desired.

Upstream transmissions, in this embodiment, can be sent in a frequency/time division multiplexing access (FDMA/TDMA) scheme. The diplexer 409 splits the lower frequency signals from the higher frequency signals so that the lower frequency, upstream signals can be applied to the electrical to optical converter 407 in the upstream path. The electrical to optical converter 407 converts the upstream electrical signals to light waves which are sent through fiber optic cable 405 and received by optical to electrical converter 403 in the node 420. The fiber optic links 405 and 406 are typically driven by laser diodes, such as Fabry Perot and distributed feedback laser diodes. Laser diodes begin to "lase" at a certain diode threshold current.

Figure 9:
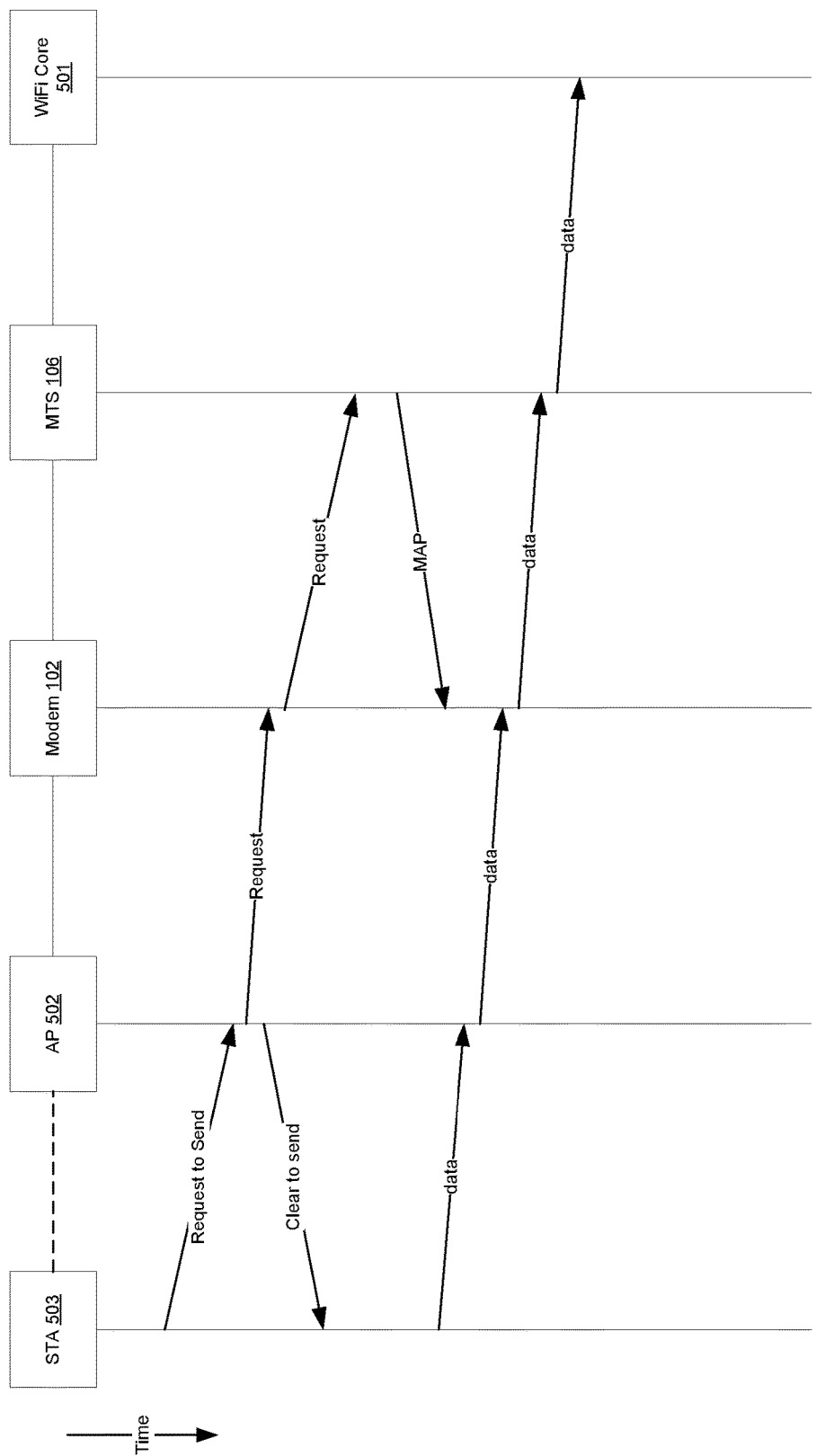
FIG. 9 is an exemplary communication diagram of the wireless service link employing WiFi.

FIG. 9 is an exemplary communication diagram of the wireless service link employing WiFi. In FIG. 9, the communication diagram is illustrated as part of a WiFi system that provides latency reduction in wireless service. In this regard, the communication link established between the modem 102 and the MTS 106 interfaces with a WiFi core 501 as well as an access point (AP) 502 (e.g., wireless access point or "WAP"). The AP 502 communicates with a WiFi station (STA) 503 such that the STA 503 can transmit data to the WiFi core 501.

The STA 503 issues a "request to send" to the AP 502 when the STA 503 needs to transmit data to the WiFi core 501. The AP 502 transfers a request to the modem 102 asking the modem 102 if the AP 502 can transfer the data of the STA 503. When the AP 502 determines that the STA 503 can transfer its data, the AP 502 transfers a "clear to send" to the STA 503. During this time, the modem 102 issues a request to transfer data to the MTS 106. And, the MTS 106 issues a MAP (or some other granting mechanism) to the modem 102 allowing the modem 102 to transfer the data of the STA 503.

From there, the modem 102 waits for the data from the AP 502. When the STA 503 transfers its data to the AP 502, the AP 502 transfers it directly to the modem 102 such that the modem 102 can transfer the data of the STA 503 through the communication link established between the modem 102 and the MTS 106. Once the MTS 106 receives the data of the STA 503, the MTS 106 transfers a data of the STA 503 to the WiFi core 501.

What is claimed is:

1. A method for reducing latency between a wireless user device and a wireless core network via a parallel communication backhaul system utilizing parallel request-grant procedures, comprising:
   detecting, at a small cell, a request to transmit data to the wireless core network initiated by the wireless user device;
   processing the request to generate a first grant to transfer a first data; and
   transmitting, within a first time window, an upstream and a downstream communication, the upstream communication including forwarding a copy of the request to the parallel communication backhaul system and the downstream communication including transmitting the first grant to the wireless user device for processing;
   wherein processing the copy of the request by the parallel communication backhaul system to generate a second grant is completed prior to the receipt of a copy of a buffer status report (BSR) from the small cell and originating from the wireless user device.

2. The method of claim 1, wherein processing the copy of the request by the parallel communication backhaul system to generate a second grant comprises,
   receiving the copy of the request at a modem;
   processing the request to generate a Modem Termination System (MTS) request;
   transmitting the MTS request to an MTS for processing and generating of second grant; and
   receiving the second grant.

3. The method of claim 1, wherein the wireless user device comprises an LTE enabled user equipment (UE).

4. The method of claim 1, wherein the wireless core network comprises a Mobile Network Operator's (MNO) mobile core network.

5. The method of claim 1, wherein the parallel communication backhaul system is selected from the group consisting of a DOCSIS network, a satellite communication network, a Digital Subscriber Line (DSL) network, and an optical network.

6. The method of claim 1, wherein the first data is a buffer status report (BSR).

7. The method of claim 6, wherein the request to generate a grant to transfer the BSR is processed after a copy of the request is forwarded to the parallel communication backhaul system.

8. The method of claim 1, wherein the wireless core network comprises a Wi-Fi core network.

\* \* \* \* \*